United States Patent Office 3,348,626
Patented Oct. 24, 1967

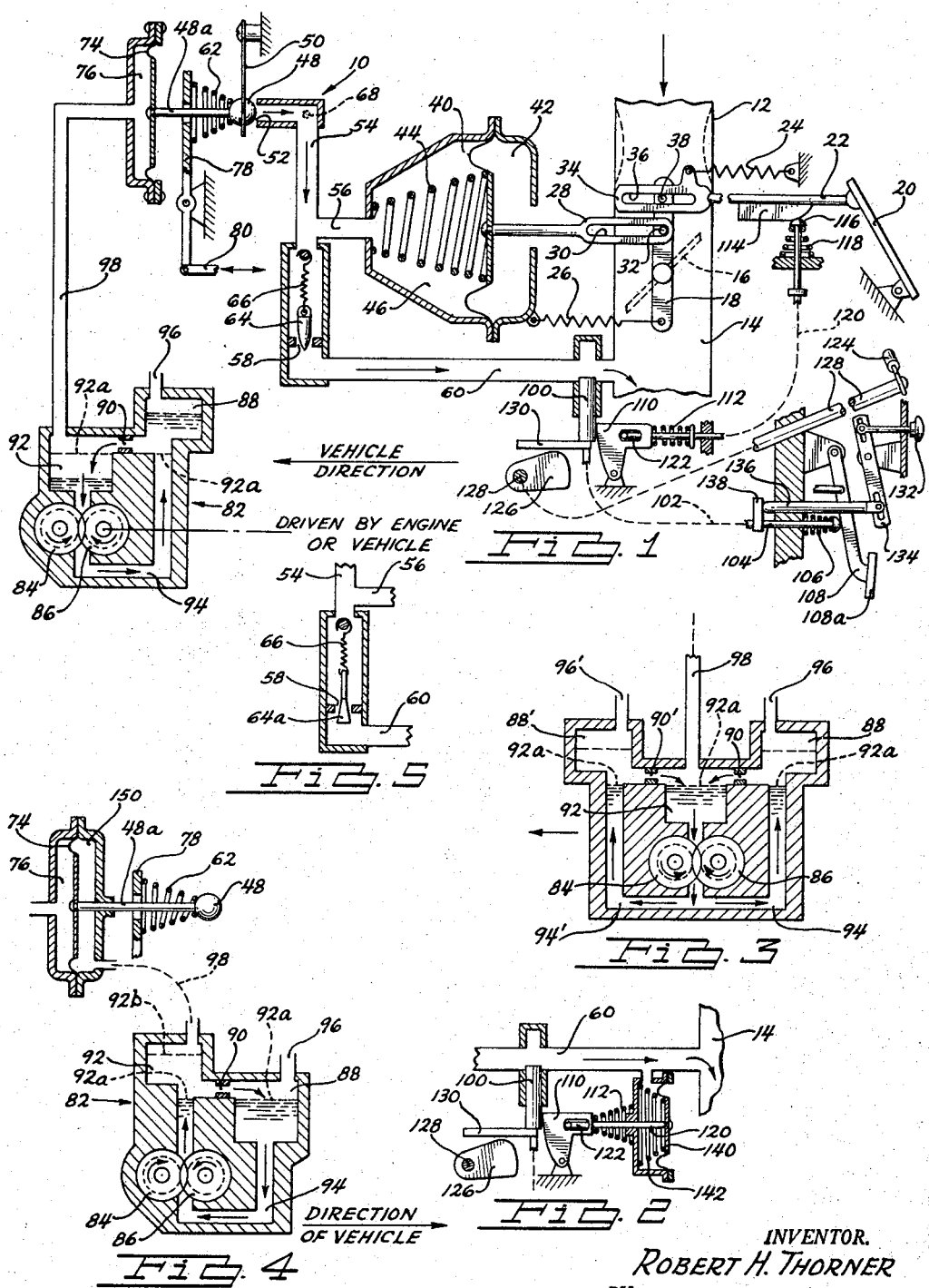

3,348,626
VEHICLE SPEED REGULATING DEVICE
Robert H. Thorner, 8750 W. Chicago Blvd.,
Detroit, Mich. 48204
Continuation of application Ser. No. 283,272, May 27, 1963, which is a division of application Ser. No. 74,315, Dec. 7, 1960, now Patent No. 3,153,325, dated Oct. 20, 1964. This application June 30, 1966, Ser. No. 562,006
39 Claims. (Cl. 180—108)

The present application is a continuation of my application Ser. No. 283,272, filed May 27, 1963, which is a division of application Ser. No. 74,315, filed Dec. 7, 1960, entitled "Speed Regulating Device," now Patent No. 3,153,325. The latter application was copending with my related applications Ser. No. 683,318, filed Sept. 11, 1957, now Patent No. 3,084,758, and Ser. No. 712,847, filed Feb. 3, 1958, now Patent No. 3,114,427. The present application relates to subject matter of the general type of invention disclosed in my application Ser. No. 815,177, filed May 22, 1959, now Patent No. 3,068,849.

The present invention relates primarily but not necessarily to speed regulators for automotive engines, and is particularly directed to novel fluid servo-mechanism, novel sensing means thereof, and novel control means therefor.

In regulators having a fluid servo-motor controlled by a pilot valve, such as speed regulators, the elimination of undesirable fluid static and dynamic forces acting on the valve has always been a puzzling problem. This problem is significant in modulating-type pilot valve structures, and is most severe in the environment of the single-acting type servo-motor. When a "closed-loop" regulator is responsive to a controlled condition, it is usually desirable for the pilot valve to respond to changes in the controlled condition substantially independent of static and fluid dynamic forces acting on the valve.

The disturbing or unbalancing fluid forces acting on a pilot valve, as above discussed, are produced by at least two basic factors. One important factor is the variation in the source pressure acting on the pilot valve, when such variation is significant in relation to the sensing or signal forces which actuate the pilot valve. Another factor, *for a constant value of the source pressure*, comprises the two fluid force variations acting on the pilot valve as the valve travels throughout its operating range; one of these fluid force variations comprises the changes in force produced by the static pressure acting on the uncompensated but varying effective area of the pilot valve which is exposed to the source pressure; the second of these force variations is the fluid dynamic (Bernoulli) effect produced on the pilot valve by the changing velocity of the controlled fluid as the valve changes its travel-position.

In my copending application, Ser. No. 815,177, now Patent No. 3,068,849, two means are disclosed to compensate for the above described unbalancing forces; one means provides a disc to oppose and cancel the unbalance forces of the pilot valve; and the second means provides a pressure regulator to control the fluid pressure *before* it reaches the pilot valve. While these means are very effective, they do require some additional mechanism, particularly the pressure regulator type. Also, in the regulator of the aforesaid copending application, the pilot valve varies simultaneously the apertures of the inlet and outlet orifices of the single-acting pressure (vacuum) chamber of the servo-motor. This, of course, is highly desirable because the complete range of fluid pressure is available to the servo-motor with a very fast change of pressure for a given pilot valve travel.

However, in certain regulator applications, such as for an automotive speed regulator in turnpike driving, reduction of cost is highly critical in order for such devices to gain wide public acceptance. Such desirable reduction of cost can best be achieved by inherent simplification of the mechanism, which may be justified even at some compromise in performance from that produced by the structures disclosed in my said copending application.

A principal object of the present invention is to provide a fluid servo-type regulating device, such as a speed regulator including a pilot valve, arranged to be unaffected by undesirable variations in source pressure and of very simple principle to facilitate low cost construction.

Another object of the present invention is to provide a simple speed regulator for an internal combustion engine, in which the intake manifold vacuum varies as a function of the movement of a throttle, arranged not only to be unaffected by said undesirable variations in manifold vacuum but to utilize such vacuum variation to provide desirable speed droop control, and which arrangement provides unusual stability manifested as very smooth operation.

A further object of the present invention is to provide in cooperation with a speed regulating device for automotive highway driving, particularly of the type mentioned in the preceding paragraph, novel means to control the operation of the device in so simple a manner as to extend the use thereof to city and boulevard driving as well as for highway driving.

Another object of the present invention is to provide in cooperation with a speed operated device novel positive displacement liquid pump means to generate an air pressure that varies as a function of speed to operate the device in response to changes in vehicle (or engine) speed.

These and other objects which will appear more clearly as the specification proceeds, are accomplished according to the present invention, by the arrangement and combination of elements set forth in the following detailed description, defined in the appended claims and illustratively exemplified in the accompanying drawings, in which:

FIG. 1 is a schematic view of one form of speed regulator embodying the present invention operatively related to a carburetor and engine manifold or intake, as would be applied as a speed regulator for an automotive vehicle, and disclosing the novel control system therefor;

FIG. 2 is a modified form of the control system for the speed regulator shown in FIG. 1;

FIGS. 3 and 4 are schematic drawings showing modified forms of the novel pressure generator to provide air pressure that varies with speed as would be used in the speed regulator of FIG. 1; and FIG. 5 is a fragmentary view of a modification of a valve in the air circuit of FIG. 1.

In accordance with the broader concept of the invention I provide a regulator capable of very low-cost manufacture due to its simple construction and which is responsive to a controlled condition such as speed. In the form shown, the regulator controls the speed of an automotive vehicle including an engine with an intake passage having a throttle therein. The regulator includes a single-acting spring-biased servo-motor with inlet and outlet restrictions to the pressure (or vacuum) side thereof, one of the restrictions being exposed to a source of varying pressure as a source of energy. I provide in cooperation only with the other restriction (not exposed to the source pressure) a modulating-type pilot means such as a pilot valve to control the pressure between the restrictions, so that in this arrangement the pilot valve is not subject to source pressure. The restriction which is exposed to the varying source pressure may be fixed or alternately may be provided with a spring-biased valve responsive to said variations of the source pressure, depending on the application of the device. For frictionless response I provide in the inventive combination leaf-spring means to support the pilot valve, which valve may be operated by any means to produce forces acting on the pilot valve and varying as a function of the controlled-condition such as speed. In the form shown, such force-producing means is illustrated as a novel pressure generator comprising positive displacement liquid pump means driven by a rotating element of the vehicle and having an orifice in a by-pass conduit and including means to convert the liquid pressure (or vacuum) to air pressure (or vacuum) to enable remote connection from the generator to an air diaphragm acting on the pilot valve. Such pressure-converter-means comprises a chamber located between the pump rotor and the orifice and mounted horizontally so gravity will provide a liquid level, and with the air pressure above the level in open communication with the sensing diaphragm so that the diaphragm and pilot valve portion can be mounted anywhere in relation to the pressure generator unit. While any suitable force-producing means may be employed in the inventive governor combination, this pressure generator has particular utility in combination with the governor construction disclosed herein, as will be discussed.

In the application of the present invention as an automatic throttle for turnpike driving, I provide control means operable only when the vehicle is in operation, such as by the transmission selector lever, to enable the device to be initially activated by the driver. In the form shown, such control means includes a valve in the source pressure line to shut off or open the source pressure to the regulator and also includes means (preferably mechanically operated as much as possible) to instantly release the device upon any application of the brake pedal; and as part of the control means I further provide means operated as a function of movement of the accelerator pedal (or the throttle, including any connecting linkage) to automatically re-activate the regulator device after a partial travel of the accelerator. In the forms shown, such last-named means comprise a flexible shaft linkage to the release means mechanically operated by the accelerator; or such means may comprise a diaphragm exposed to manifold vacuum to activate the release means after the throttle opens to reduce the manifold vacuum sufficiently, and the vehicle is automatically accelerated to the governed speed. In such control system, the device is automatically inactivated when the vehicle is not in operation and is rendered ready to be activated by the driver each time he initially activates the vehicle, and thereafter the device is automatically activated upon a selective partial travel of the accelerator following each inactivation of the device by normal operation of the brake pedal.

When the terms "pressure" or "vacuum" are used herein, they both refer to a pressure differential. Positive pressure is the difference between a superatmospheric absolute pressure and the atmospheric pressure. Vacuum is the difference between a sub-atmospheric absolute pressure and the atmospheric pressure.

Referring to FIG. 1, a speed regulator 10 for an automotive vehicle is shown to illustrate the concepts of the present invention. In FIG. 1 there is shown a conventional carburetor 12 in an engine intake passage or manifold 14 and including a throttle 16 with a lever 18, operated by an accelerator 20 through a linkage 22, all biased in the idle speed direction by an idle spring 24 and a lever spring 26, to be discussed hereinafter. The lever 18 and the throttle 16 are operated by the regulator by a first lost-motion an override member 28 having a slot 30 cooperating with a pin 32 carried by lever 18. The accelerator linkage engages lever 18 by means of a second lost-motion means such as an override member 34 having a slot 36 cooperating with a pin 38 carried by lever 18.

The override member 28 is actuated by a servo-motor which in the example shown comprises a pressure responsive member, such as a diaphragm 40 having atmospheric pressure on one side thereof in chamber 42 and vacuum on the other side thereof in chamber 46. The vacuum-derived force of diaphragm 40 is biased or opposed by a spring 44 which tends to close the throttle 16 when the regulator is in operation. The vacuum in chamber 46 acting on diaphragm 40 is modulated by pilot means which in the form shown comprises a pilot valve 48 supported for frictionless movements at one end of a leaf spring member 50, which leaf member is rigidly mounted at its other end to a fixed portion of the vehicle by suitable means. The pilot valve controls a fluid circuit or passage means in which air flows through an inlet orifice or restriction 52, a conduit or passage 54 which is in open communication with chamber 46 through a branch conduit 56, then through an outlet orifice or restriction 58, and out through a conduit 60 to the intake manifold 14.

The pilot valve 48 may assume any suitable contour, but in the form shown, a ball valve is held in alignment by leaf spring 50 and is biased in a closing direction by a speeder-spring 62 to cooperate with restriction 52 to vary the aperture thereof. The pressure (vacuum) in passage 54 between the two restrictions 52 and 58 is transmitted to diaphragm 40. A variable "bullet" shaped valve 64 is shown supported and biased by an extension spring 66 to vary the aperture of restriction 58 as a function of the difference of pressure (vacuum) in conduits 60 and 54. The valve 64 may or may not be provided depending on the application of the control device.

When the pilot valve 48 is held closed by spring 62, the full manifold vacuum exists in conduit 54 and chamber 46. When the pilot valve progressively is moved from its seated position to its full open position, by means to be discussed, the vacuum in conduit 54 and chamber 46 is modulated and *gradually* reduces to the atmospheric pressure. The maximum diaphragm vacuum obtainable in chamber 46 during regulator operation, such as 5 to 7 inches of mercury for example, is established when the diaphragm 40 overpowers the force of spring 44 to open throttle 16 until the vacuum reduces enough to enable the force of diaphragm 40 to balance the spring. For the same reason, the *minimum manifold* vacuum obtainable during regulator operation is substantially the same as this *maximum diaphragm* vacuum. As valve 48 gradually opens to increase pressure (reduce the vacuum) in chamber 46, diaphragm 40 is gradually moved to the right by spring 44 as a function of the travel of valve 48 to the left.

A sensing diaphragm 74 provides forces acting on the pilot valve in response to vacuum in chamber 76 varying as a function of vehicle (or engine) speed in a manner to be described. The forces of diaphragm 74 are opposed and balanced by spring 62 which is manually adjusted by an arm 78 operated by suitable shaft means 80, such as a flexible shaft controlled by the operator at the instrument panel (not shown).

A signal unit or pressure generator unit, shown by way of illustration, is generally indicated by the numeral 82 and produces the pressure in chamber 76, which varies as a function of speed in this instance. The pressure generator includes a rotary positive displacement pump, such as a gear pump having two meshing gears 84 and 86 rotating in opposite directions as shown by the arrows. One of these gears is the "idler" which is driven by the other, known as the driving gear, which in turn is driven by shaft means rotating as a function of the speed of the vehicle or engine. For automatic throttle operation, such shaft means would preferably comprise or be driven by the conventional speedometer shaft or any other drive rotating as a function of vehicle speed. Another example might be a shaft in an automatic transmission. Or one of the positive displacement pumps normally included in any automatic transmission could be converted to the construction disclosed herein for providing the desired air pressure varying with speed. In the form shown in FIG. 1, the gears draw liquid under vacuum from a reservoir chamber 88 through a restriction or orifice 90 into a vacuum converter or transmitter chamber 92, to be discussed, into the gear teeth and out a discharge passage or conduit 94 to the reservoir 88. The passage 94 and reservoir are maintained at approximately atmospheric pressure through a vent 96. An suitable liquid may be used such as permanent anti-freeze liquid supplied for automobile radiators. A conduit or passage 98, such as metal or plastic tubing, connects the upper (air) portion of chamber 92 with chamber 76 so that diaphragm 74 is always subjected to the vacuum in chamber 92.

In the foregoing construction, liquid pressure vacuum developed by the rotating gears 84 and 86 is transmitted to diaphragm 74 by means of the pressure (vacuum) converter or transmitter chamber 92 through a body of air trapped in the passage 98 between the liquid in the transmitter chamber and the sealed sensing diaphragm 74. Rotation of the driving gear at a faster rate produces more vacuum on the liquid in the lower part of chamber 92 and on the air in the upper part of the chamber, and also in passage 98 and in chamber 76, and conversely. The static liquid level is correct if the reservoir chamber is located *above* the pressure converter chamber whenever vacuum is transmitted to the sensing diaphragm (as shown in FIGS. 1 and 3), and *below* the pressure converter chamber whenever positive pressure is transmitted to the sensing diaphragm (as shown in FIG. 4), to be described. In FIG. 1, when the gears 84 and 86 are at rest, the liquid level assumes the position in the two chambers shown by the dotted line 92a, and the air in chambers 76 and 92 is vented to the atmosphere. When the gears rotate, liquid starts to rise in chamber 88, and when restriction 90 is "covered" by liquid vacuum is produced in chambers 92 and 76, which causes diaphragm 74 to progressively assume new positions to the left to balance spring 62 as the speed increases. Such repositioning of the diaphragm causes a displacement of the air trapped in chambers 76, 92 and conduit 98. This air displacement is accommodated by a drop in the liquid level in chamber 92 to the operating level as shown. Since there is no loss of liquid, the level in the reservoir chamber 88 must rise to the operating level as shown. Thus, whenever the pump is rotating, air (under vacuum) exists on the left side of restriction 90 and liquid (at the pressure of vent 96) exists on the right side of restriction 90. Vent 96 could be connected to the pressure on the right side of diaphragm 74 if desired. When the vehicle is inoperative, the levels in chambers 88 and 92 are equalized at level 92a, so that air in chambers 76, 92 and conduit 98 is vented to the atmosphere through vent 96; in this manner the operation of the device is unaffected by changes in altitude or temperature.

The speed-regulating action of the mechanism described thus far is as follows: When the rotary speed of the vehicle and gears 84 and 86 increases which increases the vacuum in chamber 76, diaphragm 74 pulls the pilot valve 48 to the left against spring 62 to open the restriction 52 gradually as the speed increases. This action decreases the vacuum in chamber 46 in a manner previously described, so that spring 44 expands which enables spring 26 to move throttle 16 in a closing direction tending to restore the regulated speed. When the vehicle (or engine) speed decreases, the regulating action is the reverse of that above described.

The diaphragm and spring 44 are selected to hold the throttle at its maximum opening at the highest practical *diaphragm* vacuum such as 5–7 inches of mercury in conduit 54 and chamber 46. As previously described, the necessary *diaphragm* vacuum is determined by the force of spring 44 and the size of diaphragm 40. It is desired to use as high a diaphragm vacuum as possible in order to provide sufficient force to operate the throttle and any associated linkage; however as the manifold vacuum tends to fall below this value (as when ascending steep hills) the throttle gradually closes to maintain this vacuum so that the desired regulated speed cannot be maintained. Thus the maximum diaphragm vacuum must be chosen to compromise these two opposing factors. As the valve 48 opens, the diaphragm vacuum gradually reduces from its maximum as above noted to an amount which enables the throttle 16 to close, such as to 2–3 inches of mercury, for example.

It can be seen that valve 48 is exposed only to this mildly-varying *diaphragm* vacuum in conduit 54 and not to the severely-varying *manifold* vacuum in conduit 60, which is restricted at orifice 58. This diaphragm vacuum acting on the pilot valve provides a mild "re-set" action tending to reduce the speed-droop from that which normally would be produced if the pilot valve were completely balanced aerodynamically and statically. In FIG. 1, as valve 48 is opened and the vacuum in conduit 54 reduces, as explained, the vacuum-unbalance force urging valve 48 to the right gradually reduces as the throttle closes. Such reduction in vacuum force acting on valve 48 enables it to be positioned or "re-set" progressively more to the left as the throttle closes than its corresponding positions would be if the pilot valve were completely air balanced. Such re-positioning of the pilot valve progressively to the left effects slightly more throttle closure than with a balanced valve, which in turn reduces the speed droop. This mild "re-set" or speed-droop control can be varied somewhat in the design of various constant factors such as the area of orifice 52, the area of diaphragm 74, the rate of spring 62, etc.

The particular form of regulator device shown in FIG. 1 has further utility in cooperation with an internal combustion engine having throttle-varying manifold vacuum to produce unusually stable regulation. Such stability is achieved because of the single-acting servo-motor biased in a closing direction by a spring 26 and spring 44 and biased in an opening direction by a controlled portion of manifold vacuum. In FIG. 1, consider the stabilizing action of these elements with orifice 58 comprising a fixed restriction without the bullet valve 64, as described thus far. While the regulator mechanism is in operation, for any fixed position of the pilot valve 48 (in the sense that the pilot valve movement is a series of instantaneous fixed positions), if the throttle 16 suddenly moves slightly open for any reason, the vacuum in passage 60 reduces slightly. This action causes the vacuum in passage 54 and chamber 46 to reduce correspondingly so that spring 44 expands which enables spring 26 to move the throttle in a closing direction until the diaphragm vacuum and manifold vacuum are restored to their original values. Conversely, if the throttle suddenly closes slightly for any reason, with the pilot valve in an instantaneous fixed position, the vacuum in passage 60 increases which effects a corresponding but lesser increase in vacuum in chamber 46, which results in opening the throttle until substantially the original values of diaphragm manifold vacuum are restored. In this manner the device acts as a pressure regulator in which the servo-motor maintains the throttle in a position to maintain substantially constant values of diaphragm and manifold vacuum for any instantaneous position of the pilot valve; and when the pilot valve assumes another position, the throttle automatically maintains another value of manifold vacuum. This type of operation is extremely smooth with a very "solid" stability since it rapidly restores the throttle position at all times at each travel-position of the pilot valve.

In my copending application Ser. No. 815,177, the pilot valve modulates simultaneously both the inlet and outlet orifices to control vacuum to the servo-motor. This double-valve control, of course, is highly desirable because it provides a larger range or change of vacuum for a given travel of the pilot valve. While the pilot valve control system of the present invention lends itself to lower cost manufacture, the bullet valve 64 may optionally be provided to approach the effect of the two-valve pilot-valve of this co-pending application, and also for speed-droop control. For example, when the regulator device is stable and the speed increases, the pilot valve 48 opens to lower the vacuum in chamber 46 which reduces the throttle-opening thereby increasing the vacuum in conduit 60. Such increase in "throttle" vacuum tends to move valve 64 slightly downward against the force of spring 66 which slightly increases the restrictive effect of orifice 58. This action reduces the vacuum in conduit 54 and chamber 46 more than if the bullet valve were not used so that spring 44 moves the throttle slightly more closed. In this manner, a larger change in diaphragm vacuum and hence a larger travel of throttle 16 is provided for a given travel of the pilot valve 48. For the stability action above described, it is desirable for the vacuum in chamber 46 to increase correspondingly when the manifold vacuum increases at instantaneous fixed positions of the pilot valve. This result can be controlled by the rate of spring 66. Also, the action of valve 64 above-described provides further speed-droop control.

The inherent slower action of the simplified system of the present invention can be further improved by the double abutment lost-motion or override mechanism comprising elements 28, 30, 32, 34, 36, 38. This mechanism enables the use of a smaller diaphragm 40 since the diaphragm must only operate lever 18 and throttle 16 in its regulating action. The diaphragm 40 does not operate the accelerator 20 and its linkage 22 with its undesirable friction; and the reduced air displacement of diaphragm 40 enables a faster action thereof for a given travel of pilot valve 48.

Automatic throttle devices now in use are so arranged that the vehicle must actually attain the set speed before the regulating mechanism can be activated or engaged. These present devices would tend to accelerate the vehicle much too rapidly if means were provided to enable automatic activation or engagement *before* the vehicle attains the set speed. Such devices, if capable of wide-open-throttle governing, would accelerate the vehicle at wide-open-throttle from the activated speed to the set speed, and the "roar" of the engine accompanying such fast acceleration can dangerously startle the operator. It would be highly desirable for the speed regulating device to provide sufficiently slow acceleration that it can be safely activated at any speed below the set speed; this arrangement would cause the vehicle automatically to accelerate *slowly* or at least moderately from the activated or engaged speed to the set speed. It would be particularly desirable to cause the automatic activation or engagement after a partial travel of the throttle or accelerator so that the control device cannot be activated when the engine is idling. Then after the vehicle attains a partial speed or the throttle is *consciously* opened partially, the regulator device engages and automatically accelerates the vehicle slowly to the set speed. This control system is more desirable than present control systems because (1) the operator does not have to wait until the set speed is attained each of the many times the device must be engaged in normal driving and (2) it is unecessary to rely on a "push-back" force or other signals of sound or sight to indicate when the operator can remove his foot from the accelerator. This is true because after the operator "feels" the device start to accelerate automatically, he can move his foot and the vehicle will automatically seek out and stop accelerating at exactly the set speed in each of the many times the device must be engaged in normal driving. In actual tests I have found that these two advantages greatly expand the use of these speed regulators to include city driving (on main streets and boulevards) as well as for highway driving.

Such desirable control system is disclosed in the present invention. In FIG. 1, for this purpose, as explained previously, the spring 44 is selected so that the diaphragm vacuum in chamber 46 is never more than a pre-selected value, such as 5–7 inches of mercury for example, which is a minimum for the manifold vacuum. The throttle opening at the minimum manifold vacuum corresponding to this maximum diaphragm vacuum restricts the acceleration rate sufficiently to enable safe automatic acceleration. The acceleration can be further affected by mounting the pressure generator unit in the vehicle, as shown in FIG. 1 (see arrow indicating vehicle direction), such that the reservoir chamber 88 is located toward the rear of the vehicle and the pressure converter chamber 92 is located toward the front. Then when the vehicle accelerates (to the left) the liquid pressure at the entrance of orifice 90 is slightly reduced by inertia forces of the liquid in chamber 88. This liquid-inertia effect tends to slightly increase the vacuum in chambers 92 and 76 over that normally produced without acceleration. Accordingly, the pilot valve 48 is open slightly more than normal so that the throttle 16 is closed slightly more than without acceleration, thereby affecting the acceleration.

In order to utilize the foregoing manifold-vacuum arrangement of the present invention in which moderate acceleration is effected, control means for the regulator device are provided to enable automatic acceleration after a partial travel of the accelerator; such control means also includes means to release the regulator at least upon all brake actuations as well as by selective manual release, and also includes restraining means operable upon inactivation of the vehicle to automatically render the regulator device inoperative. In FIG. 1, by way of illustration, such control means comprise a valve member 100 adjustably movable vertically, as shown, to open or close the flow of air through conduit 60. Valve 100 is connected by a flexible shaft 102 to a plunger 104 biased by a spring 106 to abut the suspended brake pedal arm 108. As shown in FIG. 1, the regulator device is in operation since conduit 60 is open. Depression of the brake pedal 108a adjusts valve 100 to shut off vacuum to chamber 46 so that spring 44 expands which enables spring 26 to close throttle 16. A small orifice 68 may optionally be provided for enabling air to fill chamber 46 faster than by only the bleed past valve 48. When valve 100 moves up in FIG. 1, a detent 110 is biased leftwardly by a spring 112 under the valve to lock it in its closed position even after releasing pedal 108a. When accelerator 20 is depressed a predetermined amount, a cam 114 enables a follower 116 to be biased upwardly by a spring 118, which pulls detent 110 free of valve 100 through a flexible shaft 120 having lost-motion connection 122 with follower 116. Spring 106 then instantly adjusts valve 100 to open and transmit vacuum to diaphragm 40 for opening the throttle and providing automatic but moderate acceleration to the set speed as determined by spring 62. When the brake pedal 108a is again depressed the foregoing cycle is repeated.

Restraining means are provided to render the regulator mechanism inoperative as a result of normal movement of an element of the vehicle incident to inactivation thereof. The restraining means illustrated in the form of my invention shown herein comprises a transmission selector lever 124 and a cam 126 operated thereby through a shaft 128 to act on a cam follower plate 130 secured to valve 100 by suitable means. When the lever 124, which comprises the "element", is placed in at least "neutral" position and possibly "park" and "reverse" positions, cam 126 acts to close valve 100 and inactivate the regulator. In order to activate the regulator again, it is necessary to place the transmission lever in "drive" (or "high gear") position and depress the accelerator until detent 110 releases valve 100. Manual restraining or lock-out means is provided and comprises a release knob 132 to manually close valve 100, and open it while driving, through a lever 134 and a pin 136 acting on an arm 138 secured to plunger 104. Suitable friction means (not shown) maintains the release knob in any desired position. The regulator also may be rendered inoperative at any time by moving shaft 80 to release the force on spring 62.

FIG. 2 shows an alternate form of control system in which the shaft 120 is actuated by a diaphragm 140 exposed to the manifold vacuum in conduit 60 and biased to the right by a spring 142. When the engine is idling, the manifold vacuum moves diaphragm 140 and its shaft 120 to the left which enables spring 112 to move detent 110 to lock valve 100 when it closes conduit 60 as above described. When the throttle is opened enough to reduce the manifold vacuum to an amount enabling spring 142 to move diaphragm 140 and detent 110 to the right, the valve 100 is instantly opened by spring 106 (FIG. 1) and the vehicle then accelerates automatically to the speed determined by spring 62 as above described.

For example, if spring 142 is selected to overpower diaphragm 140 when the manifold vacuum drops to 3–4 inches of mercury, the throttle is temporarily and "selectively" advanced until the vacuum drops to this value to cause activation. In actual operation, the driver first accelerates the vehicle to a low speed such as 15–20 m.p.h. with the governed speed set for 65 m.p.h., for example; the driver can "selectively" activate the regulator at any time by smoothly but firmly depressing the accelerator (temporarily) to drop the manifold vacuum to 3–4 inches of mercury, and the foot is then removed from the acelerator while the vehicle automatically accelerates to 65 m.p.h., and is then maintained at this speed. In the instant disclosure, such as in FIG. 2, activation after each brake actuation is merely a temporary extension of normal accelerator advancement. Also, the form of FIG. 2 is believed to be very safe, because each deliverate selective activation is made from a position of normal driving (foot on accelerator).

FIG. 3 is a modification of the pressure generator 82 in FIG. 1 arranged to eliminate all liquid inertia effects where it might be desirable in some applications of the basic governing mechanism. The construction in FIG. 3 includes merely a symmetric duplication of the reservoir 88, passage 94 and restriction 90 as elements 88', 94' and 90', respectively; and other common elements have the same reference numerals. With this arrangement, any inertia effects in one direction (left or right in FIG. 3) tending to change the vacuum in chamber 92 due to liquid-inertia effects in one reservoir would be cancelled by the same but opposite liquid inertia effects in the other reservoir.

FIG. 4 is another modification of the pressure generator of FIG. 1 arranged to produce positive air pressure instead of vacuum (negative pressure) varying as a function of speed. Elements in FIG. 4 common to the form in FIG. 1 carry the same reference numerals. In FIG. 4, the gears 84 and 86 rotate reversely from that in FIG. 1 to reverse the direction of liquid flow. Also, the reservoir chamber 88 is located below the pressure transmitter chamber 92. Conduit 98 communicates with a sealed chamber 150 to direct air pressure on diaphragm 74 which actuates valve 48 through the sealed shaft 48a. When the gears are at rest, the liquid is at level 92a. When the speed increases, the liquid rises in chamber 92 to level 92b for accommodating the displacement of diaphragm 74 as it moves valve 48 to the left. Simultaneously, the liquid in reservoir chamber 88 lowers from level 92a since no liquid is gained or lost. The operation of the pressure generator and the regulator mechanism is otherwise the same as above described. In order to obtain desired liquid-inertia effects, the pressure generator must be mounted reversely as in FIG. 1. This is indicated by the arrow showing vehicle direction in FIG. 4, so that the pressure transmitter chamber 92 must be toward the rear of the vehicle and the reservoir chamber 88 must be toward the front. If desired, the inertia effects can be eliminated by the symmetric arrangement of FIG. 3 applied to FIG. 4 in which the pressure transmitter chamber would be above the reservoir chambers.

FIG. 5 shows a modification of the apparatus shown in FIG. 1 in that the valve designated 64 of FIG. 1 is reversed in form and is shown as valve 64a in FIG. 5. This alternate construction may be used in any regulator application in which it may be desired to provide a broader speed-droop than normally would be provided with only the restriction 58 (and without the valve 64a) and/or if a greater throttle-stabilizing action is desired. With this construction, when the valve 48 opens as the speed increases, diaphragm 40 reduces the opening of throttle 16. This action increases the vacuum tending to open valve 64a which thereby increases the vacuum in chamber 46 more than without the valve 64a; this effect retards further closing of the throttle so that the speed-droop would be increased.

When the terminology in the claims recite the principles disclosed herein in terms of engine speed, it should be understood that vehicle speed and engine speed are to be interpreted synonymously in construing the invention defined by these claims. This is true, particularly for so-called "automatic throttle" devices for constant road-speed operation, as shown in FIG. 1, since at higher cruising speeds, the slippage of an automatic transmission is very slight so that engine speed is very nearly proportional to road speed.

I wish it understood that my invention is not limited to any specific construction, arrangement or form of the parts, and is capable of numerous modifications and changes without departing from the spirit and scope of the claims.

What I claim is:

1. In a control device for regulating the speed of an automotive vehicle including an internal combustion engine having an intake passage for the flow of air therethrough, a throttle operatively mounted in said passage whereby closure of said throttle increases the vacuum in said passage on the downstream side of the throttle and conversely, the combination of means to effect vehicle speed-controlling movements of said throttle comprising, a pressure-responsive member operatively connected to said throttle for actuation thereof, a vacuum circuit for the flow of air therethrough and having inlet and outlet restrictions therein, said circuit communicating with said pressure-responsive member on one side thereof at a point between said two restrictions to provide vacuum acting on said pressure-responsive member in a throttle-opening direction, said circuit having its outlet communicating with said intake passage on the downstream side of said throttle, said inlet restriction comprising valve means including a first movable valve portion to modulate the restrictive effect of said inlet restriction for controlling said vacuum acting on said pressure-responsive member to cause movements thereof, and sensing means responsive to changes in the speed of said vehicle to produce forces acting on said first valve portions for causing speed-regulating movements of said pressure-responsive member and cooperating throttle, said valve means including a second valve portion operable substantially independent of said forces and cooperating with said outlet restriction to modulate the restrictive effect thereof.

2. In a control device for regulating the speed of an internal combustion engine having an intake passage for the flow of air therethrough, a throttle operatively mounted in said passage whereby closure of said throttle increases the vacuum in said passage on the downstream side of the throttle and conversely, the combination of means to effect speed controlling movements of said throttle comprising, a pressure-responsive member operatively connected to said throttle for actuation thereof, a vacuum circuit for the flow of air therethrough and having inlet and outlet restrictions therein, said circuit communicating with said pressure-responsive member on one side thereof at a point between said two restrictions and having its outlet communicating with said intake passage on the downstream side of said throttle, said inlet restrictions including valve means having a movable valve portion to vary the restrictive effect of only said inlet restriction for controlling said vacuum acting on said pressure-responsive member to effect movements thereof, said outlet restriction including second valve means movable in response to changes in the difference between said last-named vacuum and said intake-passage vacuum to change the restrictive effect of said outlet restriction, and sensing means responsive to changes in the speed of said engine to produce forces acting on said valve portion for causing speed-regulating movements of said pressure-responsive member and cooperating throttle.

3. In a control device for regulating the speed of an automotive vehicle including an internal combustion engine having an intake passage for the flow of air therethrough, a throttle operatively mounted in said passage whereby closure of said throttle increases the vacuum in said passage on the downstream side of the throttle and conversely, the combination of means to effect speed-controlling movement of said throttle comprising, a pressure-responsive member operatively connected to said throttle for actuation thereof, a vacuum circuit for the flow of air therethrough and having inlet and outlet restrictions therein, said circuit communicating with said pressure-responsive member on one side thereof at a point between said two restrictions and having its outlet communicating with said intake passage on the downstream side of said throttle, valve means in said circuit for controlling vacuum therein acting only on said one side of said pressure-responsive member for effecting movements thereof in a direction to open said throttle, biasing means acting on said pressure-responsive member in a direction tending to close said throttle to oppose the forces produced by said last-named vacuum, said valve means comprising a pair of movable valve portions, the first of said valve portions cooperating with only said inlet restriction to modulate the restrictive effect thereof for regulating said vacuum acting on said pressure responsive member to cause movements thereof, the second of said valve portions cooperating with said outlet restriction to modulate the restrictive effect thereof for assisting said vacuum regulation and movable as a result of said movements of said first valve portion to increase the restrictive effect of said outlet restriction while the restrictive effect of said inlet restriction reduces, and conversely, and sensing means responsive to changes in the speed of said vehicle to produce forces acting on one of said valve portions for causing speed-regulating movements of said throttle.

4. In a control device for regulating the speed of an internal combustion engine having an intake passage for the flow of air therethrough, a throttle operatively mounted in said passage whereby closure of said throttle increases the vacuum in said passage on the downstream side of the throttle and conversely, the combination of means to cause speed-controlling movements of said throttle comprising, a pressure-responsive member operatively connected to said throttle for actuation thereof, a vacuum circuit for the flow of air therethrough and having inlet and outlet restrictions therein, said circuit communicating with said pressure-responsive member on one side thereof at a point between said two restrictions and having its outlet communicating with said intake passage on the downstream side of said throttle, said inlet restriction including valve means in said circuit for controlling vacuum therein acting only on said one side of said pressure-responsive member for causing movements thereof in a direction to open said throttle, biasing means acting on said pressure-responsive member in a direction tending to close said throttle to oppose the forces produced by said last-named vacuum, said valve means including a movable valve member to control the restrictive effect of said inlet restriction for regulating said vacuum acting on said pressure-responsive member to cause movements thereof, said outlet restriction including second valve means movable in response to changes in said intake-passage-vacuum to change the restrictive effect of said outlet restriction, sensing means responsive to changes in the speed of said engine to produce forces acting on said first-named valve means for causing speed-regulating movements of said throttle.

5. In a control device for regulating the speed of an automotive vehicle including an engine having control means therefor, the combination of means to cause speed-regulating movements of said control means comprising, a pressure-responsive member operatively connected to said control means for actuation thereof, a fluid circuit having a source of fluid pressure for the flow of fluid therethrough and having inlet and outlet restrictions therein, said pressure-responsive member communicating with said circuit at a point between said two restrictions, one of said restrictions including valve means having a movable valve member cooperating with said one of said restrictions to control the restrictive effect thereof for establishing the pressure between said two restrictions acting on said pressure-responsive member in a direction tending to increase vehicle speed, biasing means acting on said pressure-responsive member and said control means in a direction tending to reduce vehicle speed to oppose the forces produced by said last-named pressure, sensing means responsive to changes in the speed of said vehicle to produce forces acting on said valve member for causing speed-regulating movements of said pressure-responsive member and said control means, and said other restriction including second valve means separate from said first-named valve means to vary the restrictive effect of said other of said restrictions.

6. In a control device for regulating the speed of an engine having control means therefor, the combination of means to cause speed-regulating movements of said control means comprising, a pressure-responsive member operatively connected to said control means for actuation thereof, a fluid circuit having a source of fluid pressure for the flow of fluid therethrough and having inlet and outlet restrictions therein, said pressure-responsive member communicating with said circuit at a point between said two restrictions, one of said restrictions including valve means having a movable valve member cooperating with only said one of said restrictions to control the restrictive effect thereof for establishing the pressure between said two restrictions acting on said pressure responsive member in a direction tending to increase speed, biasing means acting on said pressure-responsive member in a direction tending to reduce speed to oppose the forces produced by said last-named pressure, said other restriction including second valve means to change the restrictive effect of said other restriction in response to changes in the position of said control means, and sensing means responsive to changes in the speed of said engine to produce forces acting on said valve member for causing speed-regulating movements of said pressure-responsive member and said control means.

7. The combination of means defined in claim 6, in which movement of said movable valve member in one direction decreases the restrictive effect of said one restriction for causing speed-restoring movements of said control means and corresponding movement of said second valve means to increase the restrictive effect of said other restriction, and conversely.

8. In a control device for regulating the speed of an engine having control means therefor and having an intake passage for the flow of air therethrough with varying air pressures therein, the combination of means to cause speed-regulating movements of said control means comprising, a pressure-responsive member operatively connected to said control means for actuation thereof, a fluid circuit having a source of fluid pressure for the flow of fluid therethrough and having inlet and outlet restrictions therein, said pressure-responsive member communicating with said circuit at a point between said two restrictions, one of said restrictions including valve means having a movable valve member cooperating with only said one of said restrictions to control the restrictive effect thereof for establishing the pressure between said two restrictions acting on said pressure-responsive member in a direction tending to increase speed, biasing means acting on said pressure-responsive member and said control means in a direction tending to reduce speed to oppose the forces produced by said last-named pressure, said other of said two restrictions including second valve means to change the restrictive effect of said other restriction in response to changes of pressure in said intake passage, and sensing means responsive to changes in the speed of said engine to produce forces acting on said valve member for causing speed-regulating movements of said pressure-responsive member and said control means.

9. In a speed control device for an automotive vehicle including an engine having movable control means therefor normally operable by the vehicle-driver and including vehicle brake-actuating means, the combination of; a speed-regulator mechanism effective to provide forces in response to a signal produced by a change in the speed of a moving element of said vehicle, means for transmitting the forces provided by said regulator mechanism to the control means for effecting speed-regulating movements thereof, selector means for establishing the operative status of said regulator mechanism with respect to said control means, said selector means including activating means to enable said regulator mechanism to be activated with respect to said control means by applying said forces thereon in the free position of said brake-actuating means, said activating means being operable in response to a partial travel of said control means to automatically activate the regulator mechanism with respect to said control means by causing said application of said forces after said partial travel for enabling said regulator mechanism to cause the vehicle to automatically accelerate from the speed corresponding to said partial travel to a predetermined speed of said moving element, and means operated by said brake-actuating means and operatively associated with said selector means to inactivate said regulator mechanism with respect to said control means without rendering same inoperative by effectively interrupting the transmission of forces from said regulator mechanism to said control means upon a predetermined and normal movement of said brake-actuating means.

10. In a speed control device for an automotive vehicle including an engine having control means therefor normally advanced to increase vehicle-speed, and conversely, and including vehicle brake-actuating means, the combination of; a regulator mechanism including a servo-motor adapted to be operatively connected to said control means to produce forces acting thereon, a source of energy for said servo-motor, said regulator mechanism including pilot means for directing a portion of said energy to said servo-motor and operable in response to a signal accompanying a change in the speed of the vehicle to cause automatic regulating movements of said control means in a direction tending to maintain a preselected regulated speed of the vehicle, release means operated by said brake-actuating means upon normal movements thereof for rendering said regulator mechanism inactive but not inoperative to transmit said forces to said control means, automatic activating means operatively associated with said mechanism and operated in response to movement of said control means upon advancement thereof to automatically effect activation of said mechanism with respect to said control means after initial advancement thereof by the vehicle-driver.

11. The combination of elements defined in claim 10, in which said activating means comprises mechanical linkage means operatively connected to said control means to automatically activate the regulator mechanism with respect to said control means after said predetermined travel thereof.

12. The combination of elements defined in claim 10, in which said engine has an intake passage for the flow of air therethrough and a throttle therein having vacuum on the downstream side thereof varying in accordance with changes in the position of the throttle, and in which said activating means includes a pressure responsive member operable independently of said servo-motor and exposed to said intake passage vacuum and operable thereby to automatically cause activation of the regulator mechanism with respect to said control means when said intake passage vacuum reduces to a predetermined value upon said advancement of said throttle by the vehicle-driver.

13. In a speed control device for an automotive vehicle including an engine having control means therefor normally advanced to increase vehicle-speed, and conversely, and including vehicle brake-actuating means, the combination of; a regulator mechanism including a servo-motor adapted to be operatively connected to said control means to produce forces acting thereon, a source of energy for said servo-motor, said regulator mechanism including pilot means for directing a portion of said energy to said servo-motor and operable in response to a signal accompanying a change in the speed of the vehicle to cause automatic regulating movements of said control means in a direction tending to maintain a preselected regulated speed of the vehicle, release means operated by said brake-actuating means upon normal movements thereof for rendering said regulator mechanism inactive but not inoperative to transmit said forces to said control means, automatic activating means operatively associated with said mechanism and operated in response to movement of said control means upon a predetermined travel thereof to automatically effect activation of said mechanism with respect to said control means after initial advancement thereof by the vehicle-driver, said activating means including means operatively connected to said control means for operation thereby to effect said automatic activation of said regulator mechanism upon said predetermined travel of said control means.

14. In a speed control device for an automotive vehicle including an engine having control means therefor normally advanced to increase vehicle-speed, and conversely, and including vehicle brake-actuating means, and also including an element manually movable by the vehicle-driver incident to normal operation of the vehicle, the combination of; a regulator mechanism operatively associated with said control means and adapted to produce forces acting thereon in response to a signal accompanying a change in the speed of the vehicle to cause automatic regulating movement of said control means in a direction tending to maintain a preselected regulated speed of the vehicle, release means operated by said brake—actuating means upon normal movements thereof for rendering said regulator mechanism inactive but not inoperative to transmit said forces to said control means, automatic activating means operatively associated with said mechanism and operated in response to movement of said control means upon advancement thereof to automatically effect activation of said mechanism with respect to said control means after initial advancement thereof by the vehicle-driver, and restraining means operable in response to movements of said element for rendering said mechanism inoperative to prevent inadvertent activation of said mechanism.

15. The combination of elements defined in claim 14, and said vehicle includes a transmission with manual selector means therefor movable at least into one non-driving and a driving position, and in which said restraining means is operatively associated with said transmission selector means to automatically move and maintain said regulator mechanism in said inoperative status when said transmission selector means is placed at least in one non-driving position and to automatically enable said regulator mechanism to be activated at least when said transmission selector means is moved into said driving position.

16. In a speed control device for an automotive vehicle including an engine having control means therefor normally advanced to increase vehicle-speed, and conversely, and including vehicle brake-actuating means, the combination of; a regulator mechanism including a servo-motor adapted to be operatively connected to said control means to produce forces acting thereon, a source of energy for said servo-motor, said regulator mechanism including pilot means for directing a portion of said energy to said servo-motor and operable in response to a signal accompanying a change in the speed of the vehicle to cause automatic regulating movements of said control means in a direction tending to maintain a preselected regulated speed of the vehicle, release means operated by said brake-actuating means upon normal movements thereof for rendering said regulator mechanism inactive but not inoperative to transmit said forces to said control means, automatic activating means operatively associated with said mechanism and operated in response to movement of said control means upon advancement thereof to automatically cause activation of said mechanism with respect to said control means after initial advancement thereof by the vehicle-driver, said automatic activation being effected at a vehicle speed lower than said regulated speed, and said regulator mechanism being adapted to cause automatic acceleration of the vehicle from said lower speed to said regulated speed and tending automatically to maintain said preselected regulated speed thereafter.

17. In a speed control device for an automotive vehicle including an engine having control means therefor normally advanced to increase vehicle-speed, and conversely, and including vehicle brake-actuating means, the combination of; a regulator mechanism operatively associated with said control means and adapted to produce forces acting thereon in response to a signal accompanying a change in the speed of the vehicle to cause automatic regulating movements of said control means in a direction tending to maintain a preselected regulated speed of the vehicle, release means operated by said brake-actuating means upon normal movements thereof for rendering said regulator mechanism inactive but not inoperative to transmit said forces to said control means, automatic activating means operatively associated with said mechanism and operated in response to movement of said control means upon advancement thereof to automatically cause activation of said mechanism with respect to said control means after initial advancement thereof by the vehicle-driver, said automatic activation being effected at a vehicle speed substantially lower than said regulated speed, said regulator mechanism being constructed and arranged to cause automatic acceleration of the vehicle from said lower speed to said regulated speed and tending automatically to maintain said preselected regulated speed thereafter, and said device including means affected by operation of said control means to cause a restriction of the rate of said automatic acceleration.

18. In a speed control device for an automotive vehicle including an engine having control means therefor normally advanced to increase vehicle-speed, and conversely, and including vehicle brake-actuating means, the combination of; a regulator mechanism operatively associated with said control means and adapted to produce forces acting thereon in response to a signal accompanying a change in the speed of the vehicle to cause automatic regulating movements of said control means in a direction tending to maintain a preselected regulated speed of the vehicle, means for operatively transmitting said forces to said control means, movable adjusting means operatively associated with said mechanism for controlling said transmission of said forces and movable into at least three settings to establish three respective conditions of operation of said regulator mechanism comprising (1) active operation with respect to said control means in which said forces are caused to be transmitted, (2) inactive operation in which no force is transmitted but from which it can be automatically readjusted to said active operation, and (3) an inoperative condition from which it can be readjusted at least to said inactive condition only upon a deliberate operative movement by the vehicle-driver; selector means operatively associated with said adjusting means and including means manually movable at least into "on" and "off" positions to cause operation of said adjusting means, restraining means operable when said manually movable means stands in said "on" position to cause said adjusting means to reside in said third setting for rendering said mechanism inoperative, said selector means when manually moved from said "off" position to said "on" position being adapted to reset said adjusting means to at least said second setting for changing said mechanism from said inoperative to said inactive condition but ready for activation with respect to said control means, said selector means including means to retain same in said "on" position after being manually moved thereto at least once by the vehicle-driver, said adjusting means in said second setting thereof including means to enable automatic activation of said mechanism with respect to said control means after at least partial manual advancement thereof, release means operable by said brake-actuating means for operating said adjusting means to temporarily change said mechanism from said active to said inactive condition but not to said inoperative condition, and to automatically return said release means and said adjusting means to their original positions in relation to said brake-actuating means after the driver removes his foot therefrom and after said manual advancement of said control means by the vehicle-driver without re-setting the manually movable means.

19. The combination of means defined in claim 18, in which said adjusting means is constructed and arranged to be selectively operable by the vehicle-driver at his discretion to cause said automatic activation at a speed substantially lower than said regulated speed and provides automatic acceleration of the vehicle from said lower speed to said regulated speed, at which regulated speed said acceleration is automatically terminated by said regulator mechanism thereupon to cause said automatic speed-regulating movements of said control means.

20. In a speed control device for an automotive vehicle including an internal combustion engine having an air intake passage and a throttle operatively mounted therein producing a vacuum on the downstream side thereof which reduces as the throttle advances, and conversely, to establish the speed of the vehicle, and further including movable brake-actuating means, the combination of; a regulator mechanism operatively associated with said control means and adapted to produce forces acting thereon in response to a signal accompanying a change in the speed of the vehicle to cause automatic regulating movements of said control means in a direction tending to maintain a preselected regulated speed of the vehicle, release means operated by said brake-actuating means upon normal movements thereof for rendering said regulator mechanism inactive but not inoperative to transmit said forces to said control means, automatic activating means operatively associated with said mechanism and operated in response to movement of said control means upon advancement thereof to automatically cause activation of said mechanism with respect to said control means after initial advancement thereof by the vehicle-driver, said automatic activation being effected at a vehicle speed lower than said regulated speed, said regulator mechanism being adapted to cause automatic acceleration of the vehicle from said lower speed to said regulated speed and tending automatically to maintain said preselected regulated speed thereafter, and said device including means operable upon reduction of said passage vacuum below a predetermined value to cause a restriction of the rate of said automatic acceleration.

21. In a speed control device for an automotive vehicle including an internal combustion engine having an air intake passage and a throttle operatively mounted therein producing a vacuum on the downstream side thereof which reduces as the throttle advances, and conversely, to establish the speed of the vehicle, and further including movable brake-actuating means, the combination of; a pressure-responsive member operatively connected of said throttle for transmitting forces thereto for actuation thereof, a vacuum circuit for the flow of air therethrough communicating with said pressure-responsive member on one side thereof and having its outlet communicating with said intake passage on the downstream side of said throttle, valve means in said circuit for controlling vacuum therein acting only on said one side of said pressure-responsive member for causing movements thereof in a direction to open said throttle, biasing means acting on said pressure-responsive member in a direction tending to close said throttle to oppose the forces produced by said last-named vacuum, sensing means responsive to changes in a signal accompanying a change in the speed of the vehicle to produce forces acting on said valve means for causing speed-regulating movements of said pressure-responsive member and said throttle, release means operated by said movements of said brake-actuating means for rendering said pressure-responsive member inactive but not inoperative with respect to said throttle to transmit said first-named forces, automatic activating means operated in response to movement of said throttle upon advancement thereof to activate automatically said pressure-responsive member with respect to said throttle after initial advancement thereof by the vehicle-driver, said regulator mechanism being constructed and arranged to cause automatic acceleration of the vehicle from said lower speed to said regulated speed and tending automatically to maintain said preselected regulated speed thereafter, and said biasing means providing a minimum force for preventing the passage vacuum from falling below a minimum value whenever said throttle tends to open during said automatic acceleration and in which further opening of said throttle during said automatic acceleration reduces said intake passage vacuum acting on said pressure responsive member which causes the throttle to retard until the vacuum acting on said pressure-responsive member is restored to said minimum value, and conversely, for restricting the rate of said automatic acceleration.

22. In a speed control device for an automotive vehicle including an engine having control means therefor normally advanced to increase vehicle-speed, and conversely, the combination of; a regulator mechanism for causing automatic regulating movements of said control means in a direction tending to maintain a preselected vehicle speed, said regulator mechanism including a pressure-responsive member operatively connected to said control means for transmitting forces thereto for causing said speed-regulating movements thereof, a fluid circuit having a flow of fluid therethrough and communicating with said pressure-responsive member, valve means in said circuit for controlling fluid pressure therein acting on said pressure responsive member for causing said movements thereof, sensing means responsive to changes in a signal accompanying a change in behicle speed to produce forces acting on said valve means for causing said speed-regulating movements of said control means, and automatic activating means operated in response to movement of said control means upon advancement thereof to activate automatically said pressure-responsive member with respect to said control means after initial advancement thereof by the vehicle-driver.

23. In a speed control device for an automotive vehicle including an engine having control means therefor normally advanced to increase vehicle-speed, and conversely, and including vehicle brake-actuating means, the combination of; a regulator mechanism for causing automatic regulating movements of said control means in a direction tending to maintain a preselected vehicle speed, said regulator mechanism including a pressure-responsive member operatively connected to said control means for causing said speed-regulating movements thereof, a fluid circuit having a flow of fluid therethrough and communicating with said pressure-responsive member, valve means in said circuit for controlling fluid pressure therein acting on said pressure-responsive member for causing said movements thereof, sensing means responsive to changes in a signal accompanying a change in vehicle speed to produce forces acting on said valve means for causing said speed-regulating movements of said control means, release means operated by said brake-actuating means upon normal movements thereof for rendering said regulator mechanism inactive but not inoperative to transmit said forces to said control means, automatic activating means operatively associated with said mechanism and operated in response to movement of said control means upon advancement thereof to automatically cause activation of said mechanism with respect to said control means after initial advancement thereof by the vehicle-driver, said automatic activation being effected at a vehicle speed substantially lower than said regulated speed, and said regulator mechanism being constructed and arranged to cause automatic acceleration of the vehicle from said lower speed to said regulated speed and tending automatically to maintain said preselected regulated speed thereafter.

24. In a control device for an automotive vehicle including an engine having control means therefor, said vehicle including a rotating element, the combination of means to effect speed-regulating movements of said control means comprising, a pressure-responsive member operatively connected to said control means for actuation thereof, a fluid circuit having a source of fluid pressure for the flow of fluid therethrough and having inlet and outlet restrictions therein, said pressure-responsive member communicating with said circuit at a point between said two restrictions, valve means including a movable valve member cooperating with only one of said restrictions to control the restrictive effect thereof for establshing the pressure between said two restrictions acting on said pressure-responsive member in a direction tending to increase speed, biasing means acting on said pressure-responsive member and said control means in a direction tending to reduce speed to oppose the forces produced by said last-named pressure, pressure-sensitive means acting on said valve member for causing speed-regulating movements thereof and said pressure-responsive member and said control means, and rotary means driven by said rotating element and including positive displacement pumping means to produce a liquid pressure that varies as a function of the speed of rotation of said rotary means, and pressure transmitter means communicating with said pumping means and said pressure-sensitive means to convert said liquid pressure to gas pressure also varying as a function of the speed of rotation of said rotary means for causing said speed regulating movements of said valve member.

25. In a speed control device for an automotive vehicle including an engine having control means therefor normally advanced to increase vehicle-speed, and conversely, and including vehicle brake-actuating means, said vehicle including an element manually movable by the vehicle-driver incident to normal operation of the vehicle, and said vehicle also including means providing a fluid pressure that varies as a function of the position of said control means, the combination of; a regulator mechanism operatively associated with said control means and adapted to produce forces acting thereon in response to a signal accompanying a change in the speed of the vehicle to cause automatic regulating movements of said control means in a direction tending to maintain a preselected regulated speed of the vehicle, means operated by said brake-actuating means upon normal movements thereof for rendering said regulator mechanism inactive but not inoperative to transmit said forces to said control means, automatic activating means operatively associated with said mechanism and operable in response to changes in said pressure varying as a result of manual advancement of said control means to automatically cause activation of said mechanism with respect to said control means after an initial advancement thereof by the vehicle-driver, and restraining means operable in response to movements of said element for rendering said mechanism inoperative.

26. In a speed control device for an automotive vehicle including an engine having an intake passage for the flow of air therethrough and a throttle therein which produces vacuum on the downstream side thereof varying in accordance with changes in the position of the throttle, said throttle being manually advanced to increase vehicle speed accompanied by a reduction in said vacuum, and conversely, said vehicle including brake-actuating means, said vehicle also including an element manually movable by the vehicle-driver incident to a normal operation of the vehicle, the combination of; a regulator mechanism operatively associated with said throttle and adapted to produce forces acting thereon in response to a signal accompanying a change in the speed of the vehicle to cause automatic regulating movements of said throttle in a direction tending to maintain a preselected regulated speed of the vehicle, means operated by said brake-actuating means upon normal movements thereof for rendering said regulator mechanism inactive but not inoperative to transmit said forces to said throttle, automatic activating means operatively associated with said mechanism and including a pressure-responsive member exposed to said intake passage vacuum and operable thereby to automatically cause activation of said regulator mechanism with respect to said control means when said intake passage vacuum reduces to a predetermined value as a result of manual advancement of said throttle by the vehicle-driver, and restraining means operable in response to movements of said element for rendering said mechanism inoperative.

27. In a speed control device for an automotive vehicle including an engine having an intake passage for the flow of air therethrough and a throttle therein which produces vacuum on the downstream side thereof varying in accordance with changes in the position of the throttle, said throttle being manually advanced to increase vehicle speed accompanied by a reduction in said vacuum, and conversely, said vehicle including brake-actuating means, said vehicle also including an element manually movable by the vehicle-driver incident to normal operation of the vehicle, the combination of; a regulator mechanism operatively associated with said throttle and adapted to produce forces acting thereon in response to a signal accompanying a change in the speed of the vehicle to cause automatic regulating movements of said throttle in a direction tending to maintain a preselected regulated speed of the vehicle, means operated by said brake-actuating means upon normal movements thereof for rendering said regulator mechanism inactive but not inoperative to transmit said forces to said throttle, automatic activating means operatively associated with said mechanism and including a pressure-responsive member exposed to said intake passage vacuum and operable thereby to automatically cause activation of said regulator mechanism with respect to said control means when said intake passage vacuum reduces to a predetermined value as a result of manual advancement of said throttle by the vehicle-driver, and restraining means operable in response to movements of said element for rendering said mechanism inoperative, said automatic activation being effected at a vehicle speed substantially lower than said regulated speed, and said regulator mechanism being constructed and arranged to cause automatic acceleration of the vehicle from said lower speed to said regulated speed and tending automatically to maintain said preselected regulated speed thereafter.

28. In a speed control device for an automotive vehicle including an engine having control means therefor normally advanced to increase vehicle-speed, and conversely, and including vehicle brake-actuating means, said vehicle including means providing a fluid pressure that varies as a function of the position of said control means, the combination of; a regulator mechanism operatively associated with said control means and including means operated by at least a portion of said fluid pressure to produce forces acting on said control means in response to a signal accompanying a change in the speed of the vehicle to cause automatic regulating movements of said control means in a direction tending to maintain a preselected regulated speed of the vehicle, fluid passage means for transmitting said pressure to said regulator mechanism, automatic activating means including valve means operatively associated with said passage means and movable to a first position by said brake-actuating means upon normal movements thereof to control said fluid pressure for rendering said regulator mechanism inactive but not inoperative to transmit said forces to said control means, said automatic activating means including pressure-responsive means for controlling said valve means and subjected to said fluid pressure for maintaining said valve means in said first position after said brake-actuating means is released by the vehicle-driver, said pressure-responsive means being disposed to cause movement of said valve means to a second position in response to a change in said pressure produced by advancement of said control means, said valve means in said second position being adapted to enable transmission of said pressure portion to said regulator mechanism for automatically causing activation of said mechanism with respect to said control means.

29. In a speed control device for an automotive vehicle including an engine having an intake passage for the flow of air therethrough and a throttle therein which produces vacuum on the downstream side thereof varying in accordance with changes in the position of the throttle, said throttle being manually advanced to increase vehicle speed accompanied by a reduction in said vacuum, and conversely, said vehicle including brake-actuating means, the combination of; a regulator mechanism including means operated by vacuum and operatively associated with said throttle and adapted to produce forces acting thereon in response to a signal accompanying a change in the speed of the vehicle to cause automatic regulating movements of said throttle in a direction tending to maintain a preselected regulated speed of the vehicle, air passage means for transmitting said intake passage vacuum to said regulator mechanism, valve means operatively associated with said last-named passage means and movable to a first position by said brake-actuating means upon normal movements thereof to preclude said transmission of said vacuum to said regulator mechanism for rendering same inactive but not inoperative to transmit said forces to said throttle, said valve means being movable to a second position at any time after said brake-actuating means is released for causing said transmission of said vacuum, biasing means urging said valve means into said second position, a vacuum-responsive member for controlling said valve means and subjected to said intake passage vacuum on a first side thereof and to the atmosphere on the second side thereof for enabling said intake passage vacuum acting on said first side of said vacuum-responsive member to cause said valve means to stand in said first position for maintaining said regulator mechanism inoperative, said vacuum-responsive member being disposed to cause movement of said valve means from said first position to said second position upon sufficient reduction of said intake passage vacuum as a result of temporary advancement of said throttle by the vehicle-driver for automatically causing activation of said mechanism with respect to said throttle after an initial advancement thereof by the vehicle-driver, said vacuum-responsive member and said regulator mechanism being subjected to the intake passage vacuum while said valve means stands in said second position so that the cycle can be repeated after the next actuation of said brake-actuating means causes movement of said valve means into said first position.

30. In a speed control device for an automotive vehicle including an engine having control means therefor normally advanced to increase vehicle-speed, and conversely, and including vehicle brake-actuating means, said vehicle also including means providing a fluid pressure that varies as a function of the position of said control means, the combination of; a regulator mechanism operatively associated with said control means and including fluid motor means operated by said fluid pressure to produce forces acting on said control means in response to a signal accompanying a change in the speed of the vehicle to cause automatic regulating movements of said control means in a direction tending to maintain a preselected regulated speed of the vehicle, fluid passage means for transmitting said pressure to said regulator mechanism, valve means operatively associated with said passage means and movable into one position by operation of said brake-actuating means to preclude said pressure in said passage means from operating said fluid motor means upon each actuation of said brake-actuating means, and pressure-responsive means subjected to said passage means pressure to enable said valve means to remain in said one position until said passage means pressure changes sufficiently as a result of temporary advancement of said control means by the vehicle-driver to automatically cause activation of said mechanism with respect to said control means after an initial advancement thereof.

31. In a speed control device for an automotive vehicle including an engine having control means therefor normally advanced to increase vehicle-speed, and conversely, and including vehicle brake-actuating means, said vehicle including means providing a pressure varying as a function of the position of said control means, the combination of; a regulator mechanism operatively associated with said control means and adapted to produce forces acting thereon in response to a signal accompanying a change in the speed of the vehicle to cause automatic regulating movements of said control means in a direction tending to maintain a preselected regulated speed of the vehicle, release means operated by said brake-actuating means upon normal movements thereof for rendering said regulator mechanism inactive but not inoperative to transmit said forces to said control means, automatic activating means operatively associated with said mechanism and operated in response to movement of said control means upon temporary advancement thereof to automatically cause activation of said mechanism with respect to said control means after an initial advancement thereof by the vehicle-driver, said activating means including a pressure-sensitive member operatively associated with said brake-actuating means and responsive to said varying pressure to effect said automatic activation of said regulator mechanism in response to changes in said varying pressure upon said temporary advancement of said control means.

32. In a speed control device for an automotive vehicle including an engine having control means therefor normally advanced to increase vehicle-speed, and conversely, and including vehicle brake-actuating means, and also including an element manually movable by the vehicle-driver incident to normal operation of the vehicle, the combination of; a regulator mechanism operatively associated with said control means and adapted to produce forces acting thereon in response to a signal accompanying a change in the speed of the vehicle to cause automatic regulating movements of said control means in a direction tending to maintain a preselected regulated speed of the vehicle, release means operated by said brake-actuating means upon normal movements thereof for rendering said regulator mechanism inactive but not in operative to transmit said forces to said control means, automatic activating means operatively associated with said mechanism and operated in response to movement of said control means upon advancement thereof to automatically cause activation of said mechanism with respect to said control means after initial advancement thereof by the vehicle-driver, said automatic activation being effected in response to the movement of said control means independent of said regulated vehicle speed to enable selective activation of said regulator mechanism at any speed desired by the vehicle-driver, said regulator mechanism being constructed and arranged to cause automatic acceleration of the vehicle from the speed corresponding to the speed at which said activation occurs to said preselected regulated speed and tending automatically to maintain said regulated speed thereafter, and restraining means operable in response to movements of said element for rendering said mechanism inoperative.

33. In a speed control device for an automotive vehicle including an engine having control means therefor normally advanced to increase vehicle-speed, and conversely, and including vehicle brake-actuating means, and also including an element manually movable by the vehicle-driver incident to normal operation of the vehicle, the combination of; a regulator mechanism operatively associated with said control means and adapted to produce forces acting thereon in response to a signal accompanying a change in the speed of the vehicle to cause automatic regulating movements of said control means in a direction tending to maintain a preselected regulated speed of the vehicle, release means operated by said brake-actuating means upon normal movements thereof for rendering said regulator mechanism inactive but not inoperative to transmit said forces to said control means, automatic activating means operatively associated with said mechanism and operated in response to movement of said control means upon a predetermined advancement thereof to automatically cause activation of said mechanism with respect to said control means after said advancement thereof by the vehicle-driver, said activating means including means operatively connected to said control means for operation thereby to cause said automatic activation of said regulator mechanism upon said predetermined advancement of said control means, said automatic activation being effected at a vehicle speed lower than said regulated speed, and said regulator mechanism being adapted to cause automatic acceleration of the vehicle from said lower speed to said regulated speed and tending automatically to maintain said preselected regulated speed thereafter, and restraining means operable in response to movements of said element for rendering said mechanism inoperative.

34. In a control device for regulating the speed of an internal combustion engine having an intake passage for the flow of air therethrough, a throttle operatively mounted in said passage whereby closure of said throttle increases the vacuum in said passage on the downstream side of the throttle, and conversely, the combination of means to cause speed-controlling movements of said throttle comprising, a pressure-responsive member operatively connected to said throttle for actuation thereof, a vacuum circuit for the flow of air therethrough and having inlet and outlet restrictions therein, said circuit communicating with said pressure-responsive member on one side thereof at a point between said two restrictions and having its outlet communicating with said intake passage on the downstream side of said throttle, said inlet restriction comprising valve means in said circuit for controlling vacuum therein acting only on said one side of said pressure-responsive member for effecting movements thereof in a direction to open said throttle, biasing means acting on said pressure-responsive member in a direction tending to close said throttle to oppose the forces produced by said last-named vacuum, said valve means including a movable valve portion to modulate the restrictive effect of said inlet restriction for regulating said vacuum acting on said pressure-responsive member to effect movements thereof, said outlet restriction including second valve means movable in response to changes in the position of said throttle to change the restrictive effect of said outlet restriction, and sensing means responsive to changes in the speed of said engine to produce forces acting on said first-named valve means for causing speed-regulating movements of said throttle.

35. The combination of means defined in claim 34, in which said second valve means is adapted to decrease the restrictive effect of said outlet restriction in response to closing movements of said throttle.

36. In a speed control device for an automotive vehicle including an engine having control means therefor normally advanced to increase vehicle-speed, and conversely, and including vehicle brake-actuating means, and also including an element manually movable by the vehicle-driver incident to normal operation of the vehicle, the combination of; a regulator mechanism including a servo-motor adapted to be operatively connected to said control means to produce forces acting thereon, a source of energy for said servo-motor, said regulator mechanism including pilot means for directing a portion of said energy to said servo-motor in response to a signal accompanying a change in the speed of the vehicle for causing stable automatic regulating movements of said control means in a direction tending to maintain a preselected regulated speed of the vehicle, release means operated by said brake-actuating means upon normal movements thereof for rendering said regulator mechanism inactive but not inoperative to transmit said forces to said control means, activating means operable selectively by the vehicle-driver independent of said regulated speed of the vehicle to cause immediate activation of said mechanism with respect to said control means entirely at the discretion of said driver irrespective of said regulated vehicle speed, said regulator mechanism upon said activation being constructed and arranged to cause automatic acceleration of the vehicle from the speed at which said activation occurs to said preselected regulated speed and tending automatically to maintain said regulated speed thereafter, and restraining means operable in response to movements of said element to render said mechanism inoperative.

37. The combination of means defined in claim 36, in which said source of energy reduces as the throttle advances, and conversely, and said movable pilot means being constructed and arranged to modulate a portion of said energy transmitted to said servo-motor so that the energy supplied thereto varies as a function of the position of the pilot means and tends to move said servo-motor in a direction to advance said control means, biasing means acting on said servo-motor in a direction tending to retard said control means, sensing means responsive to changes in said signal to produce said forces acting on said pilot means for causing said movement thereof and said speed-regulating movements of said servo-motor and said control means, said biasing means producing a predetermined minimum force for preventing said variable source of energy from falling below a minimum value whenever said control means tends to advance during said automatic acceleration and in which further advancement of said control means during said automatic acceleration reduces the amount of said energy acting on said servo-motor and thereby causes said control means to retard until the amount of said energy acting on said servo-motor is restored, and conversely, to restrict the rate of said automatic acceleration.

38. The combination of means defined in claim 36, in which said engine is of the internal combustion type having an air intake passage, and said control means includes a throttle operatively mounted in said passage and producing a vacuum on the downstream side of the throttle, which vacuum reduces as the throttle advances, and conversely, to establish the speed of the vehicle, said servo-motor comprising a pressure-responsive member operatively connected to said throttle for actuation thereof, and said source of energy comprising a vacuum circuit for the flow of air therethrough communicating with said pressure-responsive member on one side thereof and having its outlet communicating with said intake passage on the downstream side of said throttle, said circuit including inlet and outlet restrictions therein, one of said restrictions including valve means having a movable portion to modulate the restrictive effect of said one restriction for varying the vacuum in said circuit acting only on said one side of said pressure-responsve member as a function of the position of said valve portion and to cause movement of said member in a direction to open said throttle, said regulator mechanism including spring means biasing said pressure-responsve member in a direction tending to close said throttle to oppose the forces, produced by said last-named vacuum, said regulator mechanism also including sensing means responsive to changes in said signal to produce said forces acting on said valve portion for causing said speed-regulating movement of said pressure-responsive member and said throttle, and said spring means providing a predetermined minimum force for preventing the passage vacuum from falling below a minimum value whenever said throttle tends to open during said automatic acceleration and in which further opening of said throttle during said automatic acceleration reduces said intake passage vacuum acting on said pressure-responsive member which causes the throttle to retard until the vacuum acting on said pressure-responsive member is restored to said minimum value, and conversely, for restricting the rate of said automatic acceleration.

39. The combination of elements defined in claim 38, and said valve means including substantially frictionless swingable leaf spring hinge means imparting rigidity in one direction acting to support said valve portion for frictionless movements in response to said speed-responsive forces by maintaining said valve portion suspended within the air controlled thereby completely free of surface contact other than air contact during operational movements thereof.

References Cited
UNITED STATES PATENTS

| | | | |
|---|---|---|---|
| 2,243,354 | 5/1941 | Musser | 180—82 X |
| 2,368,995 | 2/1945 | Mallory | 123—103 |
| 2,446,329 | 8/1948 | Hieger | 123—103 |
| 2,737,165 | 3/1956 | Thorner | 123—103 |
| 2,755,877 | 7/1956 | Kelem | 180—82.1 |
| 2,910,974 | 11/1959 | Caris | 123—103 |
| 2,990,825 | 7/1961 | Fuller et al. | 123—103 |
| 3,068,849 | 5/1962 | Thorner | 123—103 |

KENNETH H. BETTS, *Primary Examiner.*